United States Patent Office 3,116,469
Patented Dec. 31, 1963

3,116,469
TEMPERATURE COMPENSATED GAGE ARRANGEMENT
Charles T. Wu, Allston, Mass., assignor to Baldwin-Lima-Hamilton Corporation, a corporation of Pennsylvania
Filed July 28, 1961, Ser. No. 127,565
6 Claims. (Cl. 338—3)

This invention relates to bonded type electrical resistance strain gages and, more particularly, to a temperature compensated gage arrangement.

A great deal of effort has been heretofore made to obtain temperature compensation of strain gages which is essential for most work but is especially necessary for high temperature applications. The gages heretofore proposed and used have been deficient in certain respects, either structurally or functionally, for many applications.

It is an object of my invention to provide an improved temperature compensated gage arrangement that not only has very effective compensation and can be easily attached to a specimen by welding, but also has a high degree of post yield strain.

Another object is to provide an improved temperature compensated strain gage arrangement that is relatively simple and economical in its construction and has an acceptable degree of accuracy and strain response.

Other objects and advantages will be more apparent to those skilled in the art from the following description of the accompanying drawings in which.

Figure 1:
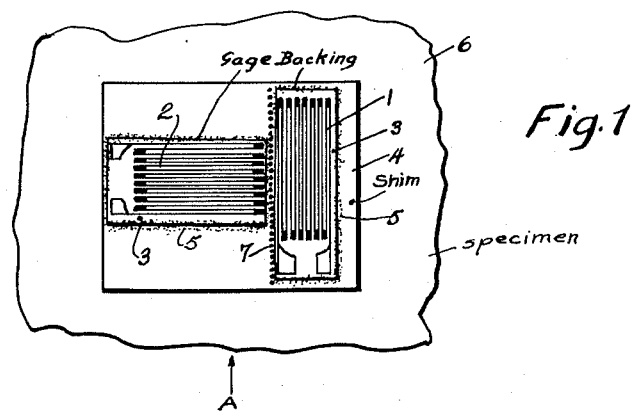
FIG. 1 is a plan view of my improved strain gage arrangement.

In the particular embodiment of my invention I provide two well-known grid-type electrical resistance filament gages 1 and 2 which are preferably located at an angle to each other specifically shown as at 90°. These gages are preferably made of etched foil material in a manner well known in the art, and in the form shown in FIG. 1 may be formed on a backing material 3 such as Bakelite. These Bakelite supported gages are then secured to a metallic shim 4 by suitable Bakelite cement 5 or other suitable heat resisting cement. The shim is preferably of stainless steel about .005" thick and its coefficient of thermal expansion is selected so as to be preferably the same or near to that of the material of a specimen 6 to which the shim is to be attached. As is well known the coefficient of thermal expansion of stainless steel varies with its particular composition so that a wide range of such materials is available for matching the shims to particular specimens. The two gages are placed, broadly, laterally of each other upon the shim with a clear space between their adjacent areas so that the shim may be suitably secured directly to the specimen surface along a linearly extending area of the shim such as by being welded to the specimen along a single straight line 7. This line of welding, which may be spot welding or of other well known suitable type, extends lengthwise of the grid axis of one of the gages preferably as close thereto as possible. Thus, the shim is entirely free of the specimen except along the single weld line. The gages will, of course, be connected in suitable arms of a bridge in a manner well known for obtaining temperature compensation. The gage 1 will receive a far higher degree of strain from the weld line 7 than will be the case with gage 2 which will receive only a very small strain effect, if any, in a transverse direction. However, due to the metal-to-metal contact of the metalic shim and specimen along an extended line both gages will be subjected to substantially the same temperature as the specimen and accordingly afford a high degree of temperature compensation.

The strain responsive gage 1 and the temperature compensating gage 2 will have a high degree of post yield sensitivity for the reason that only a proportionate part of the specimen strain is transmitted to the gages. However, notwithstanding that only a proportionate part of the specimen strain is transmitted it is found that the degree of transmission is sufficiently linear with an acceptable degree of accuracy so as to provide a very useful gage in high temperature work.

Figure 3:
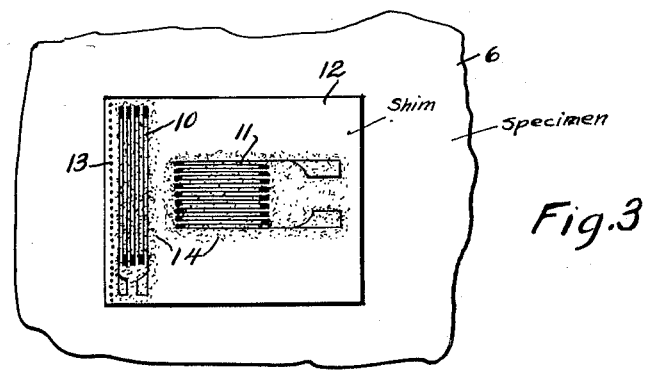
FIG. 3 is a plan view of a further compensated strain gage arrangement.
Figure 2:
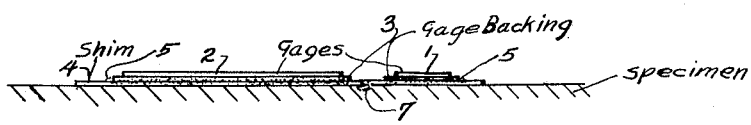
FIG. 2 is an edge view viewed in the direction of the arrow $a$ of FIG. 1.

In the modification shown in FIG. 3 the two gages 10 and 11, preferably of foil type, are cemented directly on the shim 12 by ceramic cement 14, thus avoiding the need for a gage backing such as 3. The ceramic cement as is usual is placed beneath the gage as well as over its top thereby completely electrically insulating the gage from the metallic shim 12. This modification also shows how the shim may be connected to the specimen along a welded line 13 at one end of the shim but placed lengthwise of and close to one of the gages such as 10. While the gage arrangement of FIG. 3 increase the strain sensitivity it is at the expense of mechanical ruggedness compared to that of FIG. 1.

Broadly, the shim is connected to the specimen along a limited area in a predetermined relation to the two gages so that specimen strain is transmitted to one of the gages to a greater extent than to the other but subjecting each gage to substantially the same temperature. While this is preferably accomplished by arranging the gages with their axes in a substantially T-shape relation with the weld line along either the topside or underside of the gage which forms the top of the T, yet it will be understood that modifications are possible while still obtaining the function of unequal straining of the two gages but subjecting the same to substantially equal temperatures.

It is thus seen that a so-called half bridge gage arrangement is provided in which good temperature compensation can be obtained combined with ease of manufacture and application to a specimen as well as obtaining excellent post yield sensitivity. While a half bridge is shown by reason of two gages being employed it will, of course, be understood that such gages may be duplicated to provide a full bridge.

It will, of course, be understood that various changes in details of construction and arrangement of parts may be made by those skilled in the art without departing from the spirit of invention, as set forth in the appended claims.

I claim:

1. A temperature compensated gage arrangement comprising, in combination, a metallic shim having a pair of grid type electrical resistance strain gages disposed laterally of each other and each being bonded throughout their effective length directly to the shim, and means for securing a linearly extending area of the shim directly to the surface of a specimen whose strain is to be measured, said area lying both lengthwise and alongside of the grid of one of said gages so that the portion of the shim beneath the gages is free of the specimen surface and the gages being disposed in a predetermined spaced relation to each other so that specimen strain is transmitted to one of the gages to a greater extent than to the other but subjecting each gage to substantially the same temperature whereby the gages may be connected to obtain temperature compensation.

2. The combination set forth in claim 1 further characterized in that the linearly extending area comprises a line of welding substantially parallel to the length of the gage grids of one of the gages whereby the shim is entirely free of the specimen away from the line of welding.

3. The combination set forth in claim 1 further characterized in that the gages are disposed with their grid axes substantially normal to each other so that the gage along which the linear securing area extends is more responsive to specimen strains than the other gage, whereby when said gages are connected in temperature compensating relation, the less strain sensitive gage performs the temperature compensating function.

4. The combination set forth in claim 1 further characterized in that the gages are disposed with their grid axes substantially normal to each other to form a substantially T-shaped relation, and the connecting means extends in the direction of the grid axis of the gage which forms the top of the T and along one edge of such gage.

5. The combination set forth in claim 1 further characterized in that the gages are disposed with their grid axes substantially normal to each other to form a substantially T-shaped relation, and the linear securing area extends in the direction of the grid axis of the gage which forms the top of the T and along the topside edge of such gage.

6. The combination set forth in claim 1 further characterized in that the gages are disposed with their grid axes substantially normal to each other to form a substantially T-shaped relation, and the line securing area extends in the direction of the grid axis of the gage which forms the top of the T and along the underside edge of such gage.

References Cited in the file of this patent

UNITED STATES PATENTS

| | | |
|---|---|---|
| 2,472,047 | Ruge | May 31, 1949 |
| 2,722,587 | Buzzetti | Nov. 1, 1955 |
| 2,935,709 | Paine | May 3, 1960 |